United States Patent
Sachs et al.

(10) Patent No.: US 10,477,377 B2
(45) Date of Patent: Nov. 12, 2019

(54) NETWORK NODE AND METHOD FOR MANAGING RADIO RESOURCES DEDICATED TO BEACON SIGNALING FOR D2D DISCOVERY

(75) Inventors: Joachim Sachs, Sollentuna (SE); Mikael Prytz, Rönninge (SE); Yngve Selén, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 776 days.

(21) Appl. No.: 14/427,556

(22) PCT Filed: Sep. 13, 2012

(86) PCT No.: PCT/SE2012/050964
§ 371 (c)(1),
(2), (4) Date: Mar. 11, 2015

(87) PCT Pub. No.: WO2014/042565
PCT Pub. Date: Mar. 20, 2014

(65) Prior Publication Data
US 2015/0271656 A1  Sep. 24, 2015

(51) Int. Cl.
*H04W 8/00* (2009.01)
*H04W 48/08* (2009.01)
(Continued)

(52) U.S. Cl.
CPC ......... *H04W 8/005* (2013.01); *H04W 40/244* (2013.01); *H04W 48/08* (2013.01);
(Continued)

(58) Field of Classification Search
None
See application file for complete search history.

(56) References Cited

U.S. PATENT DOCUMENTS 7,239,618 B1 * 7/2007 La Porta ............... H04L 29/06
370/331
2004/0228305 A1 * 11/2004 Grieco ............... H04B 1/7105
370/335
(Continued)

FOREIGN PATENT DOCUMENTS

WO  2010078271 A2  7/2010
WO  2011063845 A1  6/2011
(Continued)

*Primary Examiner* — Mounir Moutaouakil
(74) *Attorney, Agent, or Firm* — Murphy, Bilak & Homiller, PLLC

(57) ABSTRACT

A network node (110) and a method therein for managing radio, resources are disclosed. The radio resources are dedicated for beacon (121, 122) signaling, fey a first device; (131) and a second device (132), in conjunction with device-to-device, "D2D", discovery. The first device: (131) is stationary and the second device (132) is non-stationary. The network node (110) selects (202) a first and a second set of radio resources out of the radio resources. The first arid second sets are dedicated for beacon signaling by the first device (131) and the second device (132), respectively. The first set of radio resources Is non-overlapping with the second set of radio resources. Then the network node (110) schedules (203) a specific radio resource of the first set of radio resources to the first device (131). Next, the network node (110) sends (204) information about the scheduled specific radio resource to the first device (131). The network node (110) further sends (205) information about the second set of radio resources to the second device (132). In this manner, the second device (132) restricts Us radio resources usable for beacon signaling to the second set of radio resources.

20 Claims, 3 Drawing Sheets

(51) Int. Cl.
  *H04W 72/08* (2009.01)
  *H04W 40/24* (2009.01)
  *H04W 76/14* (2018.01)
  *H04W 84/04* (2009.01)

(52) U.S. Cl.
  CPC ......... *H04W 72/085* (2013.01); *H04W 76/14* (2018.02); *H04W 84/042* (2013.01)

(56) References Cited

U.S. PATENT DOCUMENTS

| | | | |
|---|---|---|---|
| 2005/0096089 A1 | 5/2005 | Ishii et al. | |
| 2008/0112334 A1* | 5/2008 | Laroia | H04W 40/244 370/254 |
| 2010/0165882 A1* | 7/2010 | Palanki | H04W 8/005 370/254 |
| 2011/0009062 A1* | 1/2011 | Anschutz | H04W 8/005 455/41.2 |
| 2012/0265818 A1* | 10/2012 | Van Phan | H04W 4/06 709/204 |
| 2016/0007338 A1* | 1/2016 | Van Phan | H04W 72/04 455/435.1 |
| 2016/0135200 A1* | 5/2016 | Brahmi | H04W 4/06 370/329 |

FOREIGN PATENT DOCUMENTS

| | | |
|---|---|---|
| WO | 2011116815 A1 | 9/2011 |
| WO | 2012019349 A1 | 2/2012 |
| WO | 2012085700 A1 | 6/2012 |

* cited by examiner

NETWORK NODE AND METHOD FOR MANAGING RADIO RESOURCES DEDICATED TO BEACON SIGNALING FOR D2D DISCOVERY

TECHNICAL FIELD

Embodiments herein relate to cellular radio communication networks, such as telecommunication networks, which employs Device-to-Device (D2D) communication for devices in the cellular radio communication network. A network node and a method therein for managing radio resources dedicated to beacon signaling in conjunction with D2D discovery are disclosed.

BACKGROUND

A known cellular communication network employs so called network assisted D2D communication between user equipments (UEs). Thanks to the D2D communication a load on the cellular communication network may be reduced. The load can be measured in terms of for example radio resource usage, traffic between a base station and a user equipment. In particular, load on the radio base station, comprised in the cellular communication network, may be reduced.

With the network assisted D2D communication, user equipments are allowed to use licensed spectrum resources to communicate directly with one another via a so called D2D link. In contrast, with cellular communication methods, data is transmitted through an access point, such as the radio base station, between the two user equipments. The D2D link connects the two user equipments directly, without passing user data via the radio base station. Hence, the radio base station is off loaded.

Before the D2D link may be established, the two user equipments need to detect that they are located in the proximity of each other. The detection of nearby user equipments is referred to as D2D discovery, because the user equipments discover, or detect, each other. For the purpose of discovery, special beacon signals are sent by the user equipments. The beacon signals are typically sent on a subset of radio resources allocated to the cellular radio communication network.

WO2011/063845 discloses a method for performing beacon broadcasting in a D2D network. A cellular communication network comprises a base station and a node and a further node. The node and the further node may be terminal devices. The D2D network comprises the node and the further node. A D2D communication link may be established between the node and the further node. A set of channels dedicated for the purposes of beaconing may be set by the base station. The node, capable of entering the D2D communication network, selects a channel for broadcasting from a set of channels dedicated for informing node properties in the D2D communication network. The selection is based on the characteristics of the node and/or the state of the node. Then, the node causes a broadcast of information related to at least part of the properties of the node on the selected channel. This way, the information is not only within the signal transmitted on the beacon channel but also with position or index of the employed beacon channel.

Disadvantageously, the node and the further node may select the same beacon channel when the characteristics and state of the node and the further node match. Thus, beacons, from the node and the further node, sent on the selected beacon channel collide. As a result, degenerated beacon transmission occurs.

SUMMARY

An object of embodiments herein is to manage radio resources, dedicated to beacon signaling, such that reliable beacon signaling for D2D discovery is obtained.

According to an aspect, the object is achieved by a method in a network node for managing radio resources. The radio resources are dedicated for beacon signaling, by a first device and a second device, in conjunction with D2D discovery. The first device is stationary and the second device is non-stationary. The network node selects a first and a second set of radio resources out of the radio resources. The first and second sets are dedicated for beacon signaling by the first device and the second device, respectively. The first set of radio resources is non-overlapping with the second set of radio resources. Furthermore, the network node schedules a specific radio resource of the first set of radio resources to the first device. Moreover, the network node sends information about the scheduled specific radio resource to the first device. The network node further sends information about the second set of radio resources to the second device. In this manner, the second device restricts its radio resources usable for beacon signaling to the second set of radio resources.

According to another aspect, the object is achieved by a network node configured to manage radio resources. The radio resources are dedicated for beacon signalling, by a first device and a second device, in conjunction with D2D discovery. The first device is stationary and the second device is non-stationary. The network node comprises a processing circuit configured to select a first and a second set of radio resources out of the radio resources. The first and second sets are dedicated for beacon signaling by the first device and the second device, respectively. The first set of radio resources is non-overlapping with the second set of radio resources. The processing circuit is further configured to schedule a specific radio resource of the first set of radio resources to the first device. The processing circuit is further configured to send information about the scheduled specific radio resource to the first device, and information about the second set of radio resources to the second device. In this manner, the second device restricts its radio resources usable for beacon signaling to the second set of radio resources.

According to embodiment herein, the network node selects the first set of radio resources to be used by the first device, which is stationary, for beacon signaling. Likewise, the network node selects the second set of radio resources to be used by the second device, which is non-stationary, for beacon signaling. Thanks to that the first and second sets of radio resources are non-overlapping, or at least partially non-overlapping, probability for that the radio resources used, by the first and second devices, to signal beacons collide is reduced. When the radio resources for signaling of beacons do not collide, reliability of signaling of beacons increases. As a result, the above mentioned object is achieved.

An advantage of embodiments herein is that the probability, e.g. the risk, for the first and second device to use overlapping radio resources dedicated for beacon signaling is reduced.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
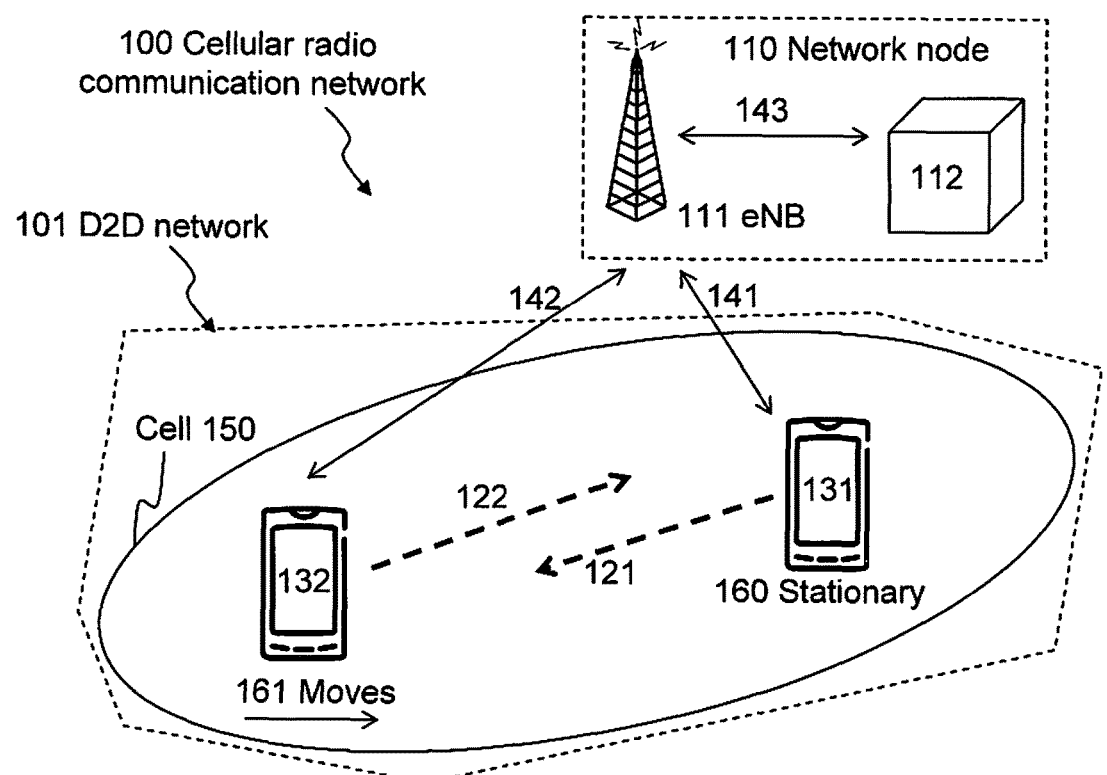
FIG. 1 is a block diagram, which shows a schematic overview of an exemplifying wireless communication network.

Throughout the following description similar reference numerals have been used to denote similar elements, network nodes, parts, items or features, when applicable.

FIG. 1 depicts an exemplifying wireless communications network 100 in which embodiments herein may be implemented. In this example, the wireless communications network 100 is a Long Term Evolution (LTE) network. In other examples, the wireless communication network 100 may be any Third Generation Partnership Project (3GPP) cellular radio communication network, such as a Wideband Code Division Multiple Access (WCDMA) network, a Global System for Mobile communication (GSM network) or the like. The wireless communication network 100 operates a network assisted D2D network 101.

The radio communication network 100 comprises a radio network node 111 and a core network node 112. The radio network node 111 may be an evolved Node B (eNB), a control node controlling one or more Remote Radio Units (RRUs), a radio base station, an access point or the like. The core network node 112 may be a Mobility Management Entity (MME), an Operation and Support System (OSS) or the like.

As used herein, the term "a network node 110" refers to the radio network node 111 and/or the core network node 112. Thus, giving a few examples, the actions presented herein may be performed by only the radio network node 111, by only the core network node 112 or some actions may be performed by the radio network node 111 and some actions may be performed by the core network node 112. In all these examples, the network node 110 is said to perform the actions. As a consequence, the network node 110 may be comprised in a cellular radio communication network 100. As an example, the network node 110 may be a control node which has been configured to control the D2D network 101.

The network node 110, typically the radio network node 111, may operate a first cell 150. More generally, the first cell 150 may be comprised in the radio communication network 100.

Furthermore, a first device 131 and a second device 132 are located in the first cell 150. Expressed differently, the first device 131 and the second device 132 may be associated with the first cell 150. The first and second devices 131, 132 may be comprised in the D2D network 101, which D2D network 101 is managed by the network node 110 via the cellular radio communication link. In other examples, the second device 132 may be associated with a second cell (not shown) neighbouring to the first cell 150.

As used herein, the term "device" may refer to a wireless device, a user equipment, a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The sensor may be any kind of weather sensor, such as wind, temperature, air pressure, humidity etc. As further examples, the sensor may be a light sensor, an electronic switch, a microphone, a loudspeaker, a camera sensor etc.

As is shown in FIG. 1, the first device 131 is stationary 160 and the second device moves 161, i.e. is non-stationary. For example, the first device 131 may be stationary due to that a user carrying the first device 131 is not moving or the first device may be stationary due to that the first device is mounted to a fixed object, such as a building, a traffic light or the like. However, according to embodiments herein, some limited degree of movement may be acceptable for a stationary device. The second device may be non-stationary due to that a user carrying the second device 132 is moving, such as going by bus or car, or the second device 132 may be non-stationary due to that it is mounted to a movable object, such as a train, bus, boat, airplane or the like.

The first and second devices 131, 132 may send beacons 121, 122. As an example, a first beacon 121 may be sent by the first device 131 and a second beacon 122 may be sent by the second device 132. As used herein, the term "beacon(s)" refers to a beacon signal or signals.

The network node 110 may be configured to communicate 141, 142 with the first and second device 131, 132, respectively over a radio interface of any 3GPP cellular communication network, such as Wideband Code Division Multiple Access (WCDMA) network, a Global System for Mobile communication (GSM) network or the like.

In some embodiments, the first device 131 may comprise a first number of stationary devices and/or the second device 132 may comprise a second number of non-stationary devices. Therefore, throughout the present disclosure, the first device 131 and/or the second device 132 may refer to one, two or more devices.

Figure 2:
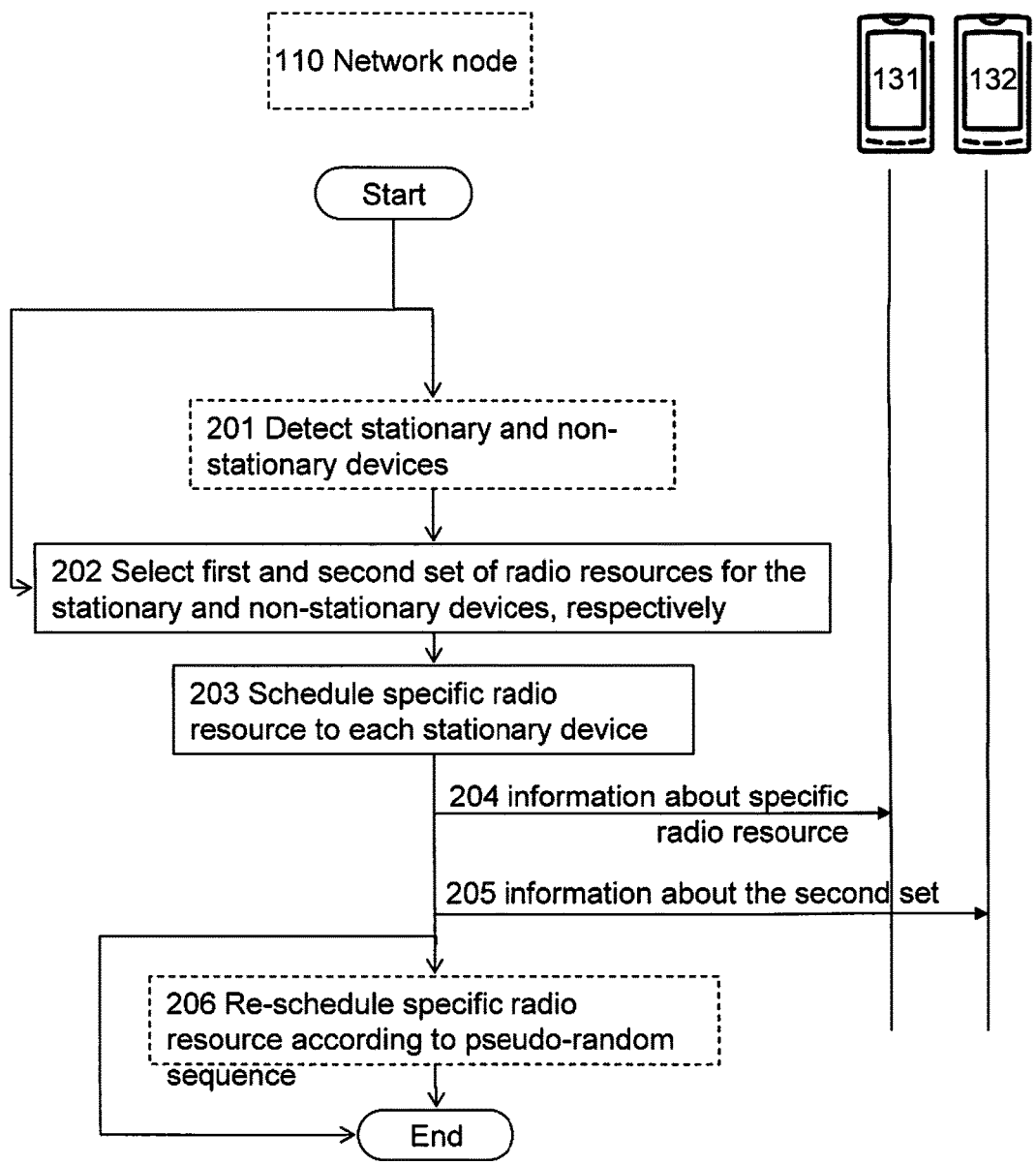
FIG. 2 is a schematic, combined signaling scheme and flowchart of embodiments of a method in the wireless communication network according to FIG. 1.

FIG. 2 illustrates an exemplifying method for managing radio resources when implemented in the radio communication network 100. Thus, the network node 110 performs a method for managing radio resources. The radio resources are dedicated for beacon 121, 122 signaling, by the first device 131 and the second device 132, in conjunction with D2D discovery. As mentioned above in conjunction with FIG. 1, the first device 131 is stationary and the second device 132 is non-stationary.

The radio resources may denote one or more resource elements in a time-frequency grid of a/the cellular radio communication network 100, comprising the network node 110. In case of an LTE network, the radio resources may be resource blocks, resource elements, a portion of a radio channel or the like. For GSM, the radio resources may denote time slots, and for WCDMA it may denote codes.

The following actions may be performed in any suitable order.

Action 201

According to some examples, the network node 110 may wish to obtain knowledge about which device(s) is stationary and which device(s) is non-stationary. Thus, the network node 110 may detect the first device 131 as stationary and the second device 132 as non-stationary among the devices 131, 132. In action 202, the network node 110 uses the knowledge.

The network node 110 may implement the detection of the first and second device 131, 132 according to various known methods.

For example, the network node 110 may send a plurality of position requests to the first and second devices 131, 132. Then in case the position of e.g. the first device 131 varies only slightly, the first device 131 will be detected as stationary.

As a further example, the network node 110 may receive information indicating that the first device 131 is stationary and that the second device 132 is non-stationary from a further network node. For example, the radio network node 111 may receive this information from for example an MME. It may also be that the information indicating that the first device 131 is stationary is received from the first device 131 itself. Similarly, it may be that the information indicating that the second device 132 is non-stationary is received from the second device 132 itself.

As yet another example, the network node 110 monitors the behaviours of the first and second devices 131, 132, e.g., if they have been present in the cell 150 for a long time.

The network node 110 may choose to include some or all of the detected stationary devices in the first number of stationary devices. Similarly, the second number of non-stationary devices may include some or all detected non-stationary device.

Therefore, in an example, the first number of stationary device may not include all stationary devices. Consider one or more stationary devices, which have a service requirement that is less than an average service requirement for all detected stationary devices. These one or more stationary devices may not be included in the first number of stationary device as explained above in that the first number does not include all detected stationary devices. This may be preferred when there is a lack of radio resources in view of a total amount of required radio resources. The total amount of required radio resources refers herein to an amount of radio resources required to fulfill the service requirement for devices associated with the network node 110. The service requirement may relate to Quality of Service (QoS), an upper limit for energy consumption of the devices or the like. The upper limit for energy consumption puts, in its turn, a limit on number of beacons per time unit.

According to some embodiments, the first device 131, e.g. a stationary device, may relate to devices for which a measure of variation of radio conditions is less than a first threshold value, and/or to devices for which a measure of time is greater than a time threshold relating to time during which the devices have been controlled by the network node 110. Furthermore, the second device 132, e.g. a non-stationary device, may relate to devices for which a measure of variation of radio conditions is greater than a second threshold value, and/or to devices for which a measure of time is lower than a time threshold relating to time during which the devices have been controlled by the network node 110.

According to other embodiments, the first device 131 may relate to devices for which a measure of its position, as obtained by e.g. Observed Time Difference of Arrival (OTDOA) or from e.g. Global Positioning System (GPS) or similar, is less than a threshold value over a defined period of time. Similarly, the second device 132 may relate to devices for which the same measure is greater than or equal to the same threshold value over the same period of time. It should be understood that in the context of the present invention, the node first device 131 need not be strictly stationary in the sense that it is not moving at all.

Action 202

The network node 110 selects a first and a second set of radio resources out of the radio resources. The first and second sets are dedicated for beacon signaling by the first device 131 and the second device 132, respectively. The network node 110 may select the first and second set of radio resources on a per radio frame basis. Additionally or alternatively, the selected first and second sets of radio resources may be valid for a specific time period. Then, information about the specific time period may be sent to the first and/or second devices 131, 132 to make them aware of the specific time period during which the first and second sets are valid. Furthermore, the specific time period may be pre-defined.

Moreover, during the specific time period the first and second sets of radio resources may be static or dynamic.

When the first and second sets of radio resources are static, the first and second sets of radio resources do not change, for example with respect to location in the time/frequency grid, until the network node 110 performs action 202 again.

When the first and second sets of radio resources are dynamic, the first and second sets of radio resources may change according to a pseudo-random sequence as described in conjunction with action 204. As an example, this means that the first and second sets change with respect to location in the time/frequency grid. These changes may occur on a radio frame basis, on a subframe basis or the like. In this manner, time/frequency diversity for the beacons is increased. Hence, reliability of the beacon signaling is improved further.

Each of the first and second sets of radio resources may be continuous or non-continuous. As an example, the first set may comprise one or more groups of radio resources from among the radio resources dedicated for beacon signaling. The groups may be contiguous or non-contiguous. Similarly, the second set of radio resources may comprise one or more groups of radio resources. Again, these groups may be contiguous or non-contiguous. See also FIG. 3.

In cases where the network node 110 controls the radio resources of the radio communication network 100, the first and second set of radio resources may not necessarily be restricted to those radio resources dedicated for signaling of beacons. Thus, the network node 110 may temporarily increase the radio resources that are available for signaling of beacons.

The first set of radio resources is non-overlapping, for example with respect to time and/or frequency, with the second set of radio resources. In some examples, the first and second sets are at least partially non-overlapping. This may be the case when the radio sources dedicated for beacon signaling, in comparison to radio resources required according to for example service requirements of the first device and the second device, are not sufficient.

As an alternative or a complement, in case of radio resource shortage, the number of devices included in the first and second set of devices may be manipulated as briefly mentioned above. For example, some stationary devices with low service requirements may be included among the non-stationary devices. Thereby, these stationary devices with low service requirements will be allowed to perform beacon signaling on randomized beacon resources in the same fashion as the non-stationary devices. See action 203 how the non-stationary devices performs beacon signaling on randomized beacon resources. Alternatively, these stationary devices may be left out from the present beacon signaling. The number of devices remaining among the first number of stationary devices shall be small enough to fit within the first set of radio resources.

In some embodiments, the selection of the first set and/or second set of radio resources is based on one or more of information relating to how often the first device 131 and/or the second device 132 requires the beacon signalling, service requirements for the first device 131 and/or second device 132, and radio resource allocation in a second cell neighboring to a first cell 150 operated by the network node 110.

The information relating to how often the first device 131 and/or the second device 132 require(s) the beacon signaling may be dependent upon the service requirements for the first device 131 and/or second device 132. The service requirement may indicate a certain maximum delay. Then, the certain maximum delay may put a constraint on at least how often it may be preferred to send beacons. The information relating to how often the first device 131 and/or the second device 132 requires the beacon signaling can also include a cap on how often the device may send beacons over a specified period of time. This cap may be set to obtain low energy consumption of the device. Further, the cap may be based on other service requirements, e.g., the first device 131 may not require very fast detection by other devices (not shown).

The radio resource allocation in the second cell may interfere with beacons sent by the first and/or second device. Thus, the first and second set may exclude radio resources allocated in the second cell. Hence, the radio resources allocated for beacon signaling may not always be completely consumed by the first and second sets of radio resources.

Moreover, the selection of the first and second sets of radio resources may be based on one or more of the first number of stationary devices 131 and the second number of non-stationary devices 132. As an example, when the first number of stationary devices is equal to the second number of non-stationary devices, a first size of the first set may be equal to a second size of the second set. More typically, the first size may be less than the second size, since scheduling of radio resources according to action 203 is expected to yield a more efficient usage of available radio resources.

In some examples, the first size of the first set of radio resources is determined, or selected, based on a required amount of radio resources required for beacon signaling by the first device. The required amount of radio resources may be given by a service requirement for the first device 131. As an example, the first size of the first set of radio resources is at least as large as given by the required amount of radio resources. Returning to the example in the preceding paragraph, if the network node 110 also considers the service requirements for the first and/or second device 131, 132, the network node 110 may allow the first size to be for example twice, or any other multiplier derived from the service requirement, as large as the second size.

Action 203

Then, the network node 110 schedules a specific radio resource of the first set of radio resources to the first device 131. In this manner, the network node 110 may ensure that the specific radio resource does not collide with any radio resource of the second set. The second device 132 may, as in prior art, randomly allocate, by itself, its beacon signalling to any radio resources from among the second set of radio resources.

Considering examples where the first device 131 comprises a first number of stationary devices. Then, the network node 110 may schedule each of the first number of devices to a respective specific radio resource. Thereby, the network node may ensure that the respective specific radio resource, allocated to one stationary device, does not collide with the respective specific radio resource, allocated to another stationary device.

In these examples, where the first device 131 comprises the first number of stationary device and the second device comprises the second number of non-stationary devices, the following applies. Since the first number of stationary devices is scheduled to the first set of radio resources, the first number of stationary device may be compactly scheduled to the first set of radio resources. Thereby, the second set of radio resources left for the non-stationary devices to randomize on is proportionally larger than if both the first number of stationary devices and the second number of non-stationary devices would, as in prior art, randomize on the radio resources dedicated to beacon signaling, i.e. all radio resources dedicated to beacon signaling.

In a simplified example, there are 5 radio resources available, 2 stationary devices and 2 non-stationary (or mobile) devices. For simplicity, it is assumed that one beacon, or beacon signal, requires one radio resource. According to embodiments herein, the 2 non-stationary devices share 3 radio resources, on which the 2 non-stationary devices may randomly allocate their beacons, and the 2 stationary devices are scheduled to 2 radio resources. In contrast, according to prior art, 4 devices, i.e. the 2 stationary devices and the 2 non-stationary devices, would randomly share 5 radio resources. In this example, there is a risk for collision of 0.808 (1−5/5*4/5*3/5*2/5) according to prior art, while there is a risk for collision of 0.333 (1−3/3*2/3) according to embodiments herein.

Action 204

Next, the network node 110 sends information about the scheduled specific radio resource to the first device 131. In this manner, the first device 131 is made aware of which radio resources to send its beacon(s) on. The information about the scheduled specific radio resource may be similar to a scheduling grant, an uplink grant or the like.

In some embodiments, the sending of the scheduled specific radio resource further comprises sending information relating to a/the pseudo-random sequence for selection of the first and second sets of radio resources to the first device 131. The information relating to the pseudo-random sequence may be the sequence itself or a seed from which the sequence may be derived. On one hand, when sending the sequence itself no coordination between the network node 110 and the first device 131, in terms on which algorithm to use for generation of the sequence, is required. On the other hand, when sending the seed, less information is transmitted as compared to when sending the sequence itself. However, as mentioned, some coordination regarding which algorithm to use for the generation of the sequence is required. Thanks to the random sequence, diversity in time and/or frequency may be improved.

In cases when the first device 131 receives the information relating to the pseudo-random sequence, the first device 131 may re-assign a further specific radio resources based on the scheduled specific radio resource and the pseudo-random sequence. The further specific radio resource may then be used for signalling of a beacon, such as the first beacon 121, relating to the first device 131. In these cases, action 206 below may be omitted.

Action 205

In order to make the second device 132 aware of onto which radio resources the second device 132 may randomly allocate its beacon signaling, action 205 may be performed. Hence, the network node 110 further sends information about the second set of radio resources to the second device 132. In this manner, the second device 132 restricts its radio resources usable for beacon signaling to the second set of radio resources. As a result, the second device 132 randomly allocates its beacon to radio resources of the second set of radio resources.

The information about the second set of radio resources may comprise information about resource elements to be used for beacon signaling and/or information relating to a pseudo-random sequence for selection of the first and second sets of radio resources. Similarly to above, the second device 132 may utilize the information relating to the pseudo-random sequence to improve diversity. As an example, the second device 132 randomly allocates its beacon to radio resources of the second set, where the second sets dynamically includes different radio resources as given by the information relating to the pseudo-random sequence.

Action 206

This action may preferably be performed when the information relating to the pseudo-random sequence is not sent to the first device 131. Thus, the network node 110 may re-schedule, to the first device 131, the specific radio resource of the first set of radio resources while taking the first set of radio resources, selected according to the pseudo-random sequence, into account. Information about the scheduled specific radio resource may be sent to the first device 131 similarly to action 204.

Figure 3:
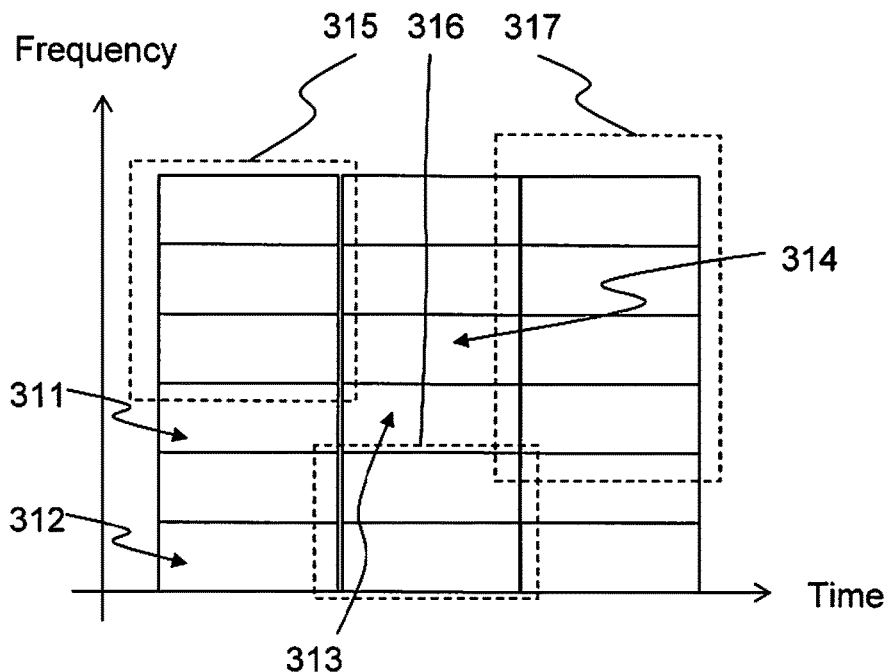
FIG. 3 is a schematic diagram in which exemplifying sets of radio resources are indicated.

Turning to FIG. 3, an exemplifying selection of sets of radio resources is shown. The sets of radio resources are illustrated in a diagram, in which time is indicated along the abscissa (horizontal axis) and frequency is indicated along the ordinate (vertical axis).

In a first example, the first set of radio resources is indicated by blocks 311-314. Blocks 315-317 indicate the second set of radio resources. Here, the first set is non-contiguous and the second set is non-contiguous.

In a second example, the first set is indicated by block 315 and the second set is indicated by block 317. Here, both the first and second sets are contiguous.

In yet further examples, the first set may be continuous and the second set may be non-contiguous.

A block may be one or more resource elements, one or more resource blocks or the like.

Figure 4:
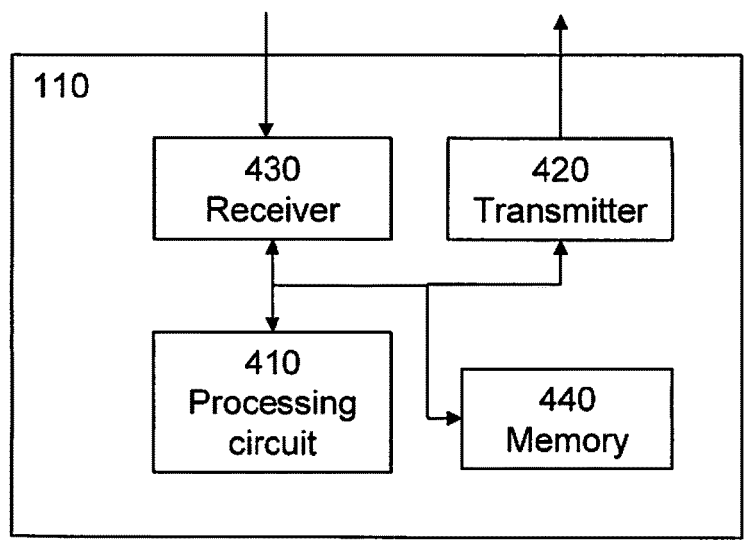
FIG. 4 is a schematic block diagram illustrating an exemplifying network node.

With reference to FIG. 4, a schematic block diagram of the network node 110 is shown. The network node 110 is configured to perform the methods in FIG. 2. The network node 110 is configured to manage radio resources. The radio resources are dedicated for beacon 121, 122 signaling, by a first device 131 and a second device 132, in conjunction with device-to-device, "D2D", discovery. The first device 131 is stationary and the second device 132 is non-stationary As mentioned, the information about the second set of radio resources may comprise information about resource elements to be used for beacon signaling and/or information relating to a pseudo-random sequence for selection of the first and second sets of radio resources.

The network node 110 may be comprised in a cellular radio communication network 100.

The first and second devices 131, 132 may be comprised in a D2D network 101, wherein the D2D network 101 is managed by the network node 110 via the cellular radio communication link.

The radio resources may denote one or more resource elements in a time-frequency grid of a/the cellular radio communication network 100, comprising the network node 110.

The first device 131 may relate to devices for which a measure of variation of radio conditions is less than a first threshold value, and/or to devices for which a measure of time is greater than a time threshold relating to time during which the devices have been controlled by the network node 110.

The second device 132 may relate to devices for which a measure of variation of radio conditions is greater than a second threshold value.

In some embodiments, the first device 131 may comprise a first number of stationary devices and the second device 132 may comprise a second number of non-stationary devices. In these embodiments, the processing circuit 410 may further be configured to select the first and second set of radio resources based on one or more of the first number of stationary devices 131, and the second number of non-stationary devices 132.

The network node 110 comprises a processing circuit 410 configured to select a first and a second set of radio resources out of the radio resources. The first and second sets are dedicated for beacon signaling by the first device 131 and the second device 132, respectively. The first set of radio resources is non-overlapping with the second set of radio resources.

The processing circuit 410 is further configured to schedule a specific radio resource of the first set of radio resources to the first device 131.

The processing circuit 410 is further configured to send information about the scheduled specific radio resource to the first device 131 and information about the second set of radio resources to the second device 132. In this manner, the second device 132 restricts its radio resources usable for beacon signaling to the second set of radio resources.

The processing circuit 410 may further be configured to select the first set and/or second set of radio resources based on one or more of information relating to how often the first device 131 and/or the second device 132 requires the beacon signaling, service requirements for the first device 131 and/or second device 132, and radio resource allocation in a second cell neighboring to a first cell 150 operated by the network node 110.

The processing circuit 410 may further be configured to send information relating to the pseudo-random sequence for selection of the first and second sets of radio resources to the first device 131.

The processing circuit 410 may further be configured to re-schedule, to the first device 131, the specific radio resource of the first set of radio resources while taking the first set of radio resources, selected according to the pseudo-random sequence, into account.

The processing circuit 410 may further be configured to detect the first device 131 as stationary and the second device 132 as non-stationary among the devices 131, 132.

The processing circuit 410 may be a processing unit, a processor, an Application Specific Integrated Circuit (ASIC), a field-programmable gate array (FPGA), a signal processor, a Digital Signal Processer (DSP) or the like. As an example, the processing unit or the like may comprise one or more processor kernels.

The network node 110 further comprises a transmitter 420, which may be configured to send one or more of the information about the specific radio resource, the information about the second set of radio resources, and other numbers, values or parameters described herein. The transmitter 420 may be a radio transmitter for radio communication, an electronic module for transmission of electric signals on a wired interface for communication with other entities.

The network node 110, 111, 112 further comprises a receiver 430, which may be configured to receive one or more of numbers, values or parameters indicating for example successful reception at the first and/or second device 131, 132 and other numbers, values or parameters described herein. The receiver 430 may be a radio receiver for radio communication, an electronic module for reception of electric signals on a wired interface for communication with other entities.

The network node 110, 111, 112 further comprises a memory 440 for storing software to be executed by, for example, the processing circuit. The software may comprise instructions to enable the processing circuit to perform the method in the network node 110 as described above in conjunction with FIGS. 2 and/or 4. The memory may be a hard disk, a magnetic storage medium, a portable computer diskette or disc, flash memory, random access memory (RAM) or the like. Furthermore, the memory may be an internal register memory of a processor.

As used herein, the term "value" may be any kind of digit, such as binary, real, imaginary or rational number or the like. Moreover, "value" may be one or more characters, such as a letter or a string of letters. "Value" may also be represented by a bit string.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, in a network node, for managing radio resources, wherein the radio resources are dedicated for beacon signaling, by a first device and a second device, in conjunction with device-to-device (D2D) discovery, wherein the first device is stationary and the second device is non-stationary, the method comprising:
    selecting a first and a second set of radio resources out of the radio resources, wherein the first and second sets each comprise a plurality of radio resources and are dedicated for beacon signaling by the first device and the second device, respectively, wherein the first set of radio resources is non-overlapping with the second set of radio resources;
    scheduling a specific radio resource of the first set of radio resources to the first device;
    sending information about the scheduled specific radio resource to the first device; and
    sending information indicating the second set of radio resources to the second device, whereby the second device restricts its radio resources usable for beacon signaling to the second set of radio resources.

2. The method of claim 1, wherein the selection of the first set and/or second set of radio resources is based on one or more of:
    information relating to how often the first device and/or the second device requires the beacon signaling;
    service requirements for the first device and/or second device; and
    radio resource allocation in a second cell neighboring to a first cell operated by the network node.

3. The method of claim 1, wherein the information indicating the second set of radio resources comprises information about resource elements to be used for beacon signaling and/or information relating to a pseudo-random sequence for selection of the first and second sets of radio resources.

4. The method of claim 1, wherein the sending of the scheduled specific radio resource further comprises sending information relating to a pseudo-random sequence for selection of the first and second sets of radio resources to the first device.

5. The method of claim 4, further comprising re-scheduling, to the first device, the specific radio resource of the first set of radio resources while taking the first set of radio resources, selected according to the pseudo-random sequence, into account.

6. The method of claim 1, further comprising detecting the first device as stationary and the second device as non-stationary among the devices.

7. The method of claim 1, wherein the network node is comprised in a cellular radio communication network.

8. The method of claim 1, wherein the first and second devices are comprised in a D2D network, wherein the D2D network is managed by the network node via a cellular radio communication link.

9. The method of claim 1, wherein the radio resources denote one or more resource elements in a time-frequency grid of a cellular radio communication network that comprises the network node.

10. The method of claim 1, wherein the first device is one of a first number of stationary devices and the second device is one of a second number of non-stationary devices, wherein the selection of the first and second set of radio resources further is based on one or more of:
    the first number of stationary devices, and
    the second number of non-stationary devices.

11. A network node configured to manage radio resources, wherein the radio resources are dedicated for beacon signaling, by a first device and a second device, in conjunction with device-to-device (D2D) discovery, the first device being stationary and the second device being non-stationary, wherein the network node comprises:
    a processing circuit configured to select a first and a second set of radio resources out of the radio resources, wherein the first and second sets each comprise a plurality of radio resources and are dedicated for beacon signaling by the first device and the second device, respectively, wherein the first set of radio resources is non-overlapping with the second set of radio resources, wherein the processing circuit further is configured to schedule a specific radio resource of the first set of radio resources to the first device; and
    a transmitter configured to send:
        information about the scheduled specific radio resource to the first device; and
        information indicating the second set of radio resources to the second device, whereby the second device restricts its radio resources usable for beacon signaling to the second set of radio resources.

12. The network node of claim 11, wherein the processing circuit further is configured to select the first set and/or second set of radio resources based on one or more of:
    information relating to how often the first device and/or the second device requires the beacon signaling;
    service requirements for the first device and/or second device; and
    radio resource allocation in a second cell neighboring to a first cell operated by the network node.

13. The network node of claim 11, wherein the information indicating the second set of radio resources comprises information about resource elements to be used for beacon signaling and/or information relating to a pseudo-random sequence for selection of the first and second sets of radio resources.

14. The network node of claim 11, wherein the transmitter further is configured to send information relating to a/the pseudo-random sequence for selection of the first and second sets of radio resources to the first device.

15. The network node of claim 14, wherein the processing circuit further is configured to re-schedule, to the first device, the specific radio resource of the first set of radio resources, while taking the first set of radio resources, selected according to the pseudo-random sequence, into account.

16. The network node of claim 11, wherein the processing circuit further is configured to detect the first device as stationary and the second device as non-stationary among the devices.

17. The network node of claim 11, wherein the network node is comprised in a cellular radio communication network.

18. The network node of claim 11, wherein the first and second devices are comprised in a D2D network, wherein the D2D network is managed by the network node via a cellular radio communication link.

19. The network node of claim 11, wherein the radio resources denote one or more resource elements in a time-frequency grid of a cellular radio communication network that comprises the network node.

20. The network node of claim 11, wherein the first device is one of a first number of stationary devices and the second device is one of a second number of non-stationary devices, wherein the processing circuit further is configured to select the first and second set of radio resources based on one or more of:

the first number of stationary devices, and
the second number of non-stationary devices.

* * * * *